United States Patent Office 2,790,828
Patented Apr. 30, 1957

2,790,828

PURIFICATION OF MONOCHLOROACETIC ACID

Jerome N. Haimsohn, Ardsley, N. Y., assignor to Stauffer Chemical Company, a corporation of Delaware No Drawing. Application March 28, 1955,
Serial No. 497,474

5 Claims. (Cl. 260—539)

This invention relates to a method of purifying monochloroacetic acid and particularly to a method of removing dichloroacetic acid from monochloroacetic acid.

In the chlorination of acetic acid to produce monochloroacetic acid, it is inevitable that some dichloro substitution takes place so that the final product is ordinarily a mixture of monochloroacetic acid and dichloroacetic acid. Technical monochloroacetic acid ordinarily contains from about 1.5% to 2.5% of dichloroacetic acid and for many purposes, it is important a purer product be obtained. Heretofore, there has been no fully satisfactory process of purifying monochloroacetic acid. Although it has been proposed to purify monochloroacetic acid by crystallization from a solvent, the process is expensive, both from the standpoint of solvent and product losses.

It is therefore the object of the present invention to provide a simple, economical process for the purification of technical monochloroacetic acid by removing dichloroacetic acid therefrom.

It has been found that purification can be effected merely by "drying" the monochloroacetic acid such as by heating the monochloroacetic acid in a vacuum drier, sweeping a stream of gas over the monochloroacetic acid, conveying the monochloroacetic acid in an air stream, or by fluidizing solid monochloroacetic acid with air or other inert gas. For this purpose, regular drying equipment can be used such as vacuum, tray, rotary, flash or other driers such as are well known to those skilled in the art for removing moisture or other volatile compounds from solids by evaporation. It is surprising that monochloroacetic acid can be purified in this way since dichloroacetic acid is higher boiling and has a lower vapor pressure than monochloroacetic acid. Thus, one would expect the monochloroacetic acid to volatilize first, but the reverse has been found to be true, as is shown by the experimental examples which follow. Although this invention is not predicated upon any theory of its operation, it is believed that the dichloroacetic acid which is present as a contaminant exists in a liquid state surrounding the monochloroacetic acid crystals. The liquid apparently has a higher effective vapor pressure than the crystalline monochloroacetic acid and can therefore be separated by evaporation, providing the monochloroacetic acid is kept in a solid state.

The process can be operated at any temperature below the melting point of monochloroacetic acid, namely 62° C. However, to secure optimum results, it is ordinarily preferred to operate at a temperature of at least 20° C.

The following non-limiting examples illustrate various embodiments of the present invention.

*Example 1.*—One pound of technical monochloroacetic acid, containing 1.64% dichloroacetic acid, was maintained in a fluidized state in a 2½" diameter, 4 foot long glass tube with nitrogen at 49° C. and at a rate of 3.1 SCFM (approximately 1.8 ft. per sec., superficial velocity) for two hours. Samples were removed at thirty minute intervals, with the following results.

| Sample No. | Stripping Time in Minutes | Wt. Loss, Percent of Charge | Dichloroacetic acid content, Wt. Percent |
|---|---|---|---|
| 1 | 0 | 0 | 1.64 |
| 2 | 30 | 1.9 | 0.96 |
| 3 | 60 | 1.9 | 0.28 |
| 4 | 90 | 2.1 | 0.06 |
| 5 | 120 | 2.1 | 0.05 |

*Example 2.*—Two pounds of technical monochloracetic acid containing 1.79% dichloroacetic acid was maintained in a fluidized state in a 2⅞" diameter, 4 foot long glass tube with dry air at 37° C. and at a rate of 4 S. C. F. M. (approximately 1.6 F. P. S., superficial velocity) for 2 hours. Samples were removed, at the end of the first and second hours, for analysis of dichloroacetic acid content. The following results were obtained:

| Sample No. | Stripping Time in Hours | Dichloroacetic Acid Content, Wt. Percent |
|---|---|---|
| 1 | 0 | 1.79 |
| 2 | 1 | 0.99 |
| 3 | 2 | 0.17 |

*Example 3.*—Three hundred pounds technical monochloroacetic acid, containing 1.53% dichloroacetic acid, was passed through a pneumatic conveying drier (flash drier) at a rate of 7.5 pounds per minute with 2000 C. F. M. of air at 45° C. The inlet air had a dew-point of 0° C. Four spot samples of product from the drier had a dichloroacetic acid content of 0.50±0.04%.

*Example 4.*—Fifty gram portions of commercial, technical monochloracetic acid, containing 2.06% dichloroacetic acid and 0.8% moisture, were dried in a vacuum oven at 40° C. and at a pressure of 10 mm. mercury. Results with varying degrees of drying are contained in the following table:

| Sample No. | Cumulative over Wt. Loss on Drying, percent | Water Content, percent | Percent Dichloroacetic Acid |
|---|---|---|---|
| 1 | 0 (starting material) | 0.8 | 2.06 |
| 2 | 2.5 | 0.2 | 1.56 |
| 3 | 5.5 | 0.05 | 0.05 |
| 4 | 6.9 | 0.05 | 0.05 |
| 5 | 8.6 | 0.05 | 0.05 |

*Example 5.*—One pound technical monochloroacetic acid containing 2.00% dichloroacetic acid was fluidized in a 2.5 inch diameter, 4 ft. long glass tube at 40° C. with undried air (from a compressor), at an air rate of 1.9 cubic feet per minute (approximately 0.9 ft. per second, superficial velocity) for periods up to 85 minutes. Results are contained in the following table:

| Sample No. | Stripping time in Minutes | Dichloroacetic Acid, Wt. percent |
|---|---|---|
| 1 | 0 | 2.00 |
| 2 | 30 | 1.70 |
| 3 | 60 | 1.48 |
| 4 | 85 | 0.95 |

*Example 6.*—600 pounds of technical monochloroacetic acid, containing 1.86% dichloroacetic acid, was passed through a pneumatic conveying drier (flash drier) at a rate of 9.0 pounds per minute with 2000 C. F. M. of air at 35° C. The inlet air had a relative humidity of 10%. The product from the drier had a dichloroacetic acid content of 0.56%.

The product from the foregoing run was passed through the flash drier a second time under identical conditions. After the second pass, the product from the drier contained 0.20% dichloroacetic acid.

I claim:

1. The process of purifying monochloroacetic acid which contains a small percentage of dichloroacetic acid as a contaminant, comprising heating said monochloroacetic acid containing said contaminant at a temperature of not over 62° C. and permitting dichloroacetic acid to volatilize therefrom.

2. The process of purifying monochloroacetic acid which contains dichloroacetic acid as a contaminant comprising fluidizing said monochloroacetic acid in a gas stream at a temperature of not over 62° C.

3. The process of purifying monochloroacetic acid which contains dichloroacetic acid as a contaminant comprising heating said monochloroacetic acid in a vacuum oven at a temperature of not over 62° C.

4. The process of purifying monochloroacetic acid which contains dichloroacetic acid as a contaminant comprising passing an inert gas over the surface of said monochloroacetic acid at a temperature of not over 62° C.

5. The process of purifying monochloroacetic acid which contains a small percentage of dichloroacetic acid as contaminant, comprising conveying sad monochloroacetic acid in a gas stream at a temperature of not over 62° C. whereby dichloroacetic acid is volatilized therefrom.

References Cited in the file of this patent

Young: "Distillation Principles and Processes," 1922, pp. 223 and 475.